United States Patent
Shuder et al.

(10) Patent No.: US 7,729,962 B2
(45) Date of Patent: Jun. 1, 2010

(54) TIMECARD PROCESSING IN A PROCUREMENT MANAGEMENT SYSTEM

(75) Inventors: James Shuder, San Carlos, CA (US); Shailesh Prakash, Santa Clara, CA (US); Sridatta Viswanath, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1718 days.

(21) Appl. No.: 09/953,411

(22) Filed: Sep. 14, 2001

(65) Prior Publication Data
US 2003/0055755 A1 Mar. 20, 2003

(51) Int. Cl.
G06Q 99/00 (2006.01)

(52) U.S. Cl. .............................. 705/32; 705/34; 705/1; 705/50

(58) Field of Classification Search ................ 705/50, 705/1, 32–34
See application file for complete search history.

(56) References Cited

U.S. PATENT DOCUMENTS

| | | | |
|---|---|---|---|
| 4,383,298 A | 5/1983 | Huff et al. | |
| 5,216,612 A | 6/1993 | Cornett et al. | |
| 6,289,317 B1* | 9/2001 | Peterson | 705/7 |
| 6,609,108 B1 | 8/2003 | Pulliam et al. | |
| 6,832,176 B2 | 12/2004 | Hartigan et al. | |
| 2001/0047311 A1 | 11/2001 | Singh | |
| 2001/0051889 A1 | 12/2001 | Haney | |
| 2002/0023045 A1 | 2/2002 | Feilbogen et al. | |
| 2002/0052801 A1 | 5/2002 | Norton et al. | |
| 2002/0065693 A1 | 5/2002 | Hattori et al. | |
| 2002/0069145 A1* | 6/2002 | Collado et al. | 705/32 |
| 2002/0069157 A1 | 6/2002 | Jordan | |
| 2002/0087419 A1 | 7/2002 | Andersson et al. | |
| 2002/0091533 A1 | 7/2002 | Ims et al. | |
| 2002/0107699 A1 | 8/2002 | Rivera et al. | |
| 2002/0116205 A1 | 8/2002 | Ankireddipally et al. | |
| 2002/0133569 A1 | 9/2002 | Huang et al. | |
| 2002/0156687 A1 | 10/2002 | Carr et al. | |
| 2002/0174000 A1 | 11/2002 | Katz et al. | |
| 2002/0178021 A1* | 11/2002 | Melchior et al. | 705/1 |
| 2002/0184070 A1 | 12/2002 | Chen et al. | |
| 2002/0184145 A1 | 12/2002 | Sijacic et al. | |
| 2002/0188524 A1 | 12/2002 | Shimizu | |
| 2003/0002526 A1 | 1/2003 | Dias et al. | |
| 2003/0061121 A1 | 3/2003 | Ouchi | |
| 2003/0074269 A1 | 4/2003 | Viswanath | |

(Continued)

*Primary Examiner*—Jalatee Worjloh
(74) *Attorney, Agent, or Firm*—Robert C. Kowert; Meyertons, Hood, Kivlin, Kowert & Goetzel, P.C.

(57) ABSTRACT

The present invention provides timecard processing in a procurement management system. A service provider creates and submits an on-line timecard, the timecard is approved by an approver, and the billing information is forwarded to a payment processing function. An embodiment comprises the steps of: providing a user interface for entry, modification and approval of timecard data; reading a timecard projects table to add data to the timecard data; comparing the received timecard data to the timecard projects table to determine if the received timecard data is valid: reading a contractor profile table to add data to the timecard data; reading timecard business rules; applying the timecard business rules, reading an approval matrix; notifying at least one approver to the existence of the received timecard data; computing billing amounts; accepting changes to the timecard data; receiving approval for payment of the billing amounts; and transmitting payment data.

19 Claims, 3 Drawing Sheets

U.S. PATENT DOCUMENTS

| | | |
|---|---|---|
| 2003/0074271 A1 | 4/2003 | Viswanath et al. |
| 2003/0074279 A1 | 4/2003 | Viswanath et al. |
| 2003/0074287 A1 | 4/2003 | Shuder et al. |
| 2003/0078798 A1 | 4/2003 | Zaks et al. |
| 2003/0125966 A1 | 7/2003 | Viswanath et al. |
| 2003/0139975 A1 | 7/2003 | Perkowski |
| 2003/0177070 A1 | 9/2003 | Viswanath et al. |
| 2003/0204367 A1* | 10/2003 | Hartigan et al. .............. 702/178 |
| 2004/0260601 A1* | 12/2004 | Brief ............................ 705/11 |
| 2005/0049903 A1* | 3/2005 | Raja ............................... 705/7 |

* cited by examiner

```
301    <transmission>

302        <type datatype="string">
303        Timecard</type>

304        <buyer_company_name datatype="string">
305        Mercury Enterprises</buyer_company_name>

306        <contracting_company_name datatype="string">
307        Horizon</for_organization_name>

308        <created_by datatype="string">
309        Shailesh Prakash</created_by>

310        <designation datatype="string">
311        Senior Consultant </designation>

312        <task datatype="line">
313            <task_name datatype="string>
314            BuyerXpert </task_name>
315            <accounting_code datatype="string">
316            1100990 <accounting_code>
317            <regular_time datatype="long">
318            35 </regular_time>
319            <overtime datatype="long">
320            5 </overtime>
321            <holiday_time datatype="long">
322            3 </holiday_time>
323        </task>

324        <task datatype="line">
325            <task_name datatype="string>
326            SellerXpert </task_name>
327            <accounting_code datatype="string">
328            1100991 <accounting_code>
329            <regular_time datatype="long">
330            30 </regular_time>
331            <overtime datatype="long">
332            3 </overtime>
333            <holiday_time datatype="long">
334            2 </holiday_time>
335        </task>

336    </transmission>
```

*FIG. 3*

TIMECARD PROCESSING IN A PROCUREMENT MANAGEMENT SYSTEM

BACKGROUND OF THE INVENTION

1. Field of the Invention

The present invention relates to the field of Enterprise Resource Planning (ERP) software, and within this field, procurement management systems, sometimes called "e-procurement".

2. Related Art

As part of modern business practice, companies have uses computers for tracking accounts receivable and accounts payable. More recently, procurement management systems provide on-line (i.e., via computer) browsing of catalogs, online ordering of catalog items, electronic purchase orders, and electronic billing. In other words, these computer-based systems are attempting to encompass as much of the procurement process as possible, including integrating directly with suppliers for things such as catalog items, ordering, and billing.

A procurement management system can be described as being made up of processes that interact with resources within the procurement management system framework to accomplish the task of electronic procurement. These systems, in general, are customized by their administrators or vendors to meet the needs of a particular organization.

FIG. 1 shows a procurement management system 100 that includes four processing functions: (1) selection processing 105 that typically includes searching supplier catalogs, ordering items from catalogs (creating requisitions), and submitting requisitions for approval; (2) approval processing 107, where requisitions are approved as orders; (3) order processing 109 that typically includes transmitting orders to supplier organizations and tracking requisitions and orders; and (4) payment processing 111 where tracking of received goods and gathering of payment information occurs (accounts payable processing). The data used and/or created by these processing functions are shown separately in FIG. 1, but can be one large database. Such a database can reside on a server so as to be accessible from a plurality of other computers. The user 121 is the person who wants to purchase goods, and initiates the requisition process.

During procurement, there are a number of entities that are manipulated by procurement management system 100 users 121, administrators, or processes. These entities are called resources, or business objects, but in their broadest sense, are simple data used by the various processing functions 105-111. Resources are either system resources or organization resources.

System resources apply to the entire procurement management system 100, affecting all organizations the same way. System resources can only be created, updated, or deleted by a super-administrator. Organization resources are any procurement management system 100 resources that are not system resources. Organization resources can be created, updated, and deleted by the organization-administrator for the organization, or any super-administrator.

Procurement management system resources include the following: members (organizations, organizational units, users, user groups, locations); accounting resources (accounting code segments, accounting code values); commodity resources (commodity code segments, commodity code values); units of measure resources (system units of measure, organization units of measure); pricing resources (price lists, price adjustments); payment resources (payment types and subtypes, payment instruments); shipping and freight; approval resources (approval matrix, approval model, delegation tables, approval cases); and business rules. The main tasks in administering a procurement management system 100 concern setting up and modifying these resources and the business rules associated with them.

Of special importance are the business rules. These rules govern how money is spent and who approves transactions. For example, a particular employee may have a $1000 spending limit, and the employees supervisor must approve transactions that have an amount greater than this.

Since procurement management systems make use of both buyer and seller resources, it is natural to use the Internet. Hence, user interfaces for performing or managing any of the processing functions 105-111 are generally done in a web-based fashion with a web browser.

Prior art procurement management systems are not well suited to processing invoices from hourly contractors, milestone-based contracting, or hourly employees. The prior art procurement management systems assume a "purchase-order-based" model that is not easily included in the system. The present patent adds a timecard capability to a procurement management system, thereby handling hourly contractors, milestone-based contracting, or hourly employees.

SUMMARY OF THE INVENTION

Accordingly, embodiments of the present invention provide timecard processing in a procurement management system 100. The invention can be applied to any service provider (e.g., employees, contractors, etc.), but, hereinafter, only contractors will be used to illustrate the invention, so as not to obscure the invention by describing too many variations. In other words, the user 121 shown in FIG. 1 will be assumed to be a contractor 121. Therefore, the present invention allows a contractor 121 (or, generically a service provider) to create an on-line timecard, submit the timecard, have the timecard approved by an approver 123 who has proper authority, and have the billing information forwarded to a payment processing function 111. The contractor 121 is not allowed to see the billing rates since the contractor 121 may work for a contracting organization that pays the contractor 121 a small fraction of the billing rate. The approver 123 can observe the billing rate and other information that is hidden from the contractor 121, such as billing codes and project totals. The approver 123 can also change information associated with the time card, such as the billing codes. The approver 123 can also deny the timecard, and the procurement management system 100 will notify the contractor 121.

A contractor 121, when creating a timecard, inputs an identifier (e.g., his name or ID number), one or more project identifiers (projects the contractor 121 is working on), and the amount of labor for each project (generally, in hours). The system 100 computes the total amount of billing from the billing rate and the amount of labor.

When contrasted with prior art procurement management systems, the present invention adds: (1) a special user interface for creating timecards (hereinafter called the timecard interface); (2) tracking a plurality of billing rates (e.g. regular time, overtime, and holiday time rates) for each contractor 121 or type of contractor (e.g. junior programmer, senior programmer, etc.); (3) tracking a plurality of projects, including a plurality of approvers for each project; (4) hiding the billing rates from the contractor 121; (5) hiding the cost center information from the contractor 121; (6) a special user interface for approving, denying, or modifying timecards (hereinafter called the approval interface); and (7) outputting an approved timecard to a payment processing function 111.

The present invention provides these advantages and features, plus others not specifically mentioned above but described in the sections to follow.

Embodiments include the above and further comprise the steps of: (A) providing a first user interface for entry of timecard data, the timecard data comprising: (i) labor provider identifier corresponding to a labor provider; (ii) one or more project identifiers; and (iii) for each the project identifier, one or more quantities of labor; (B) receiving the timecard data from a user; (C) reading a timecard projects table to add data to the timecard data, the timecard projects table comprising: (i) one or more project identifiers each corresponding to a project; and (ii) types of labor that can be applied to each of the projects; (D) comparing the received timecard data to the timecard projects table to determine if the received timecard data is valid: (E) reading a contractor profile table to add data to the timecard data, the contractor profile table comprising: (i) employer; and (ii) billing rates; (F) reading timecard business rules, the timecard business rules table comprising: (i) availability of the processing of timecards to the user; and (ii) type of approval process; (G) applying the timecard business rules, (H) reading an approval matrix, the approval matrix comprising a list of approvers, each the approver having an indication of which of the projects the each approver can approve; (I) notifying at least one the approver to existence of the received timecard data; (J) computing billing amounts using the billing rates and the quantities of labor; and (K) providing second user interface displaying data comprising: (i) the labor provider identifier; (ii) the one or more project identifiers; (iii) the one or more quantities of labor; (iv) one or more accounting codes; and (v) one or more billing rates, the billing rates not viewable by the labor provider; and (vi) the computed billing amounts; (L) accepting changes to the displayed data; (M) receiving approval for payment of the billing amounts from the approver; and (N) transmitting payment data, the payment data comprising the billing amounts.

BRIEF DESCRIPTION OF THE DRAWINGS

FIG. 3 is an example of a timecard in XML format, in accordance with an embodiment of the present invention.

DETAILED DESCRIPTION OF THE INVENTION

In the following detailed description of the present invention, timecard processing in a procurement management system, numerous specific details are set forth in order to provide a thorough understanding of the present invention. However, it will be recognized by one skilled in the art that the present invention may be practiced without these specific details or with equivalents thereof. In other instances, well known methods, procedures, components, and tools have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, program, computer executed step, logic block, process, processing function, etc., is here, and generally, conceived to be a self-consistent sequence of steps or instructions leading to a desired result, the steps or instructions being performed in one or more computing devices. The steps or instructions are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as data, information, bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "accessing" or "processing" or "computing" or "suspending" or "resuming" or "translating" or "calculating" or "determining" or "scrolling" or "displaying" or "recognizing" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
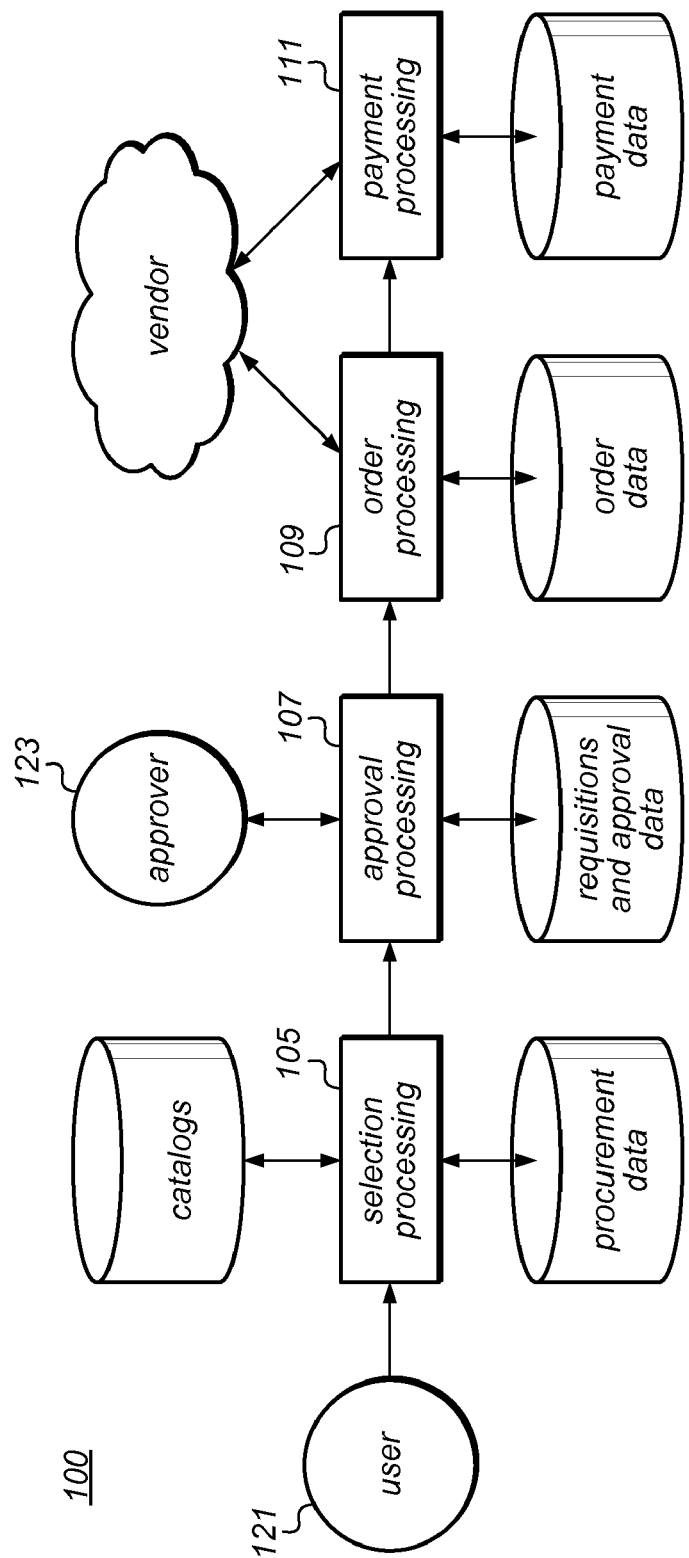
FIG. 1 is a process diagram of a typical procurement management system.

Timecard Processing in a Procurement Management System in Accordance With Present Invention The procurement management system 100 in FIG. 1 illustrates an overview of such systems, however, prior art procurement management systems do not include timecard processing capabilities. It is the objective of this invention to integrate timecard processing into the procurement management system 100 shown in FIG. 1 without changing the basic structure as it is shown in the figure. In fact, preserving this basic structure 100 is one of the primary objectives of the present patent.

The presented timecard processing method captures contractor hours into a procurement management system 100 so the tracking and approval processes of the procurement management system 100 can be used.

If an organization is setup to use the timecard process, contractors 121 are able to enter their hours into a special computer user interface (hereinafter the timecard interface) within the procurement management system. The timecard hours that are entered form the basis for the timecard requisition.

When a timecard is submitted by a contractor 121, it goes through the approval process and is available to be tracked. After the timecard requisition is approved, it is sent to the payment processing portion 111 of the system 100, where statistics are gathered or other actions are taken, depending on the needs of the organization.

The following system resources are added so as to enable the timecard process: timecard projects table; contractor profile table; timecard business rules; and timecard output formatting.

The timecard projects table lists all the projects that can be associated with timecard line items. Project data includes project name (or any form of project identifier), description, and the types of hours (equivalently, types of labor) that are allowed for the particular project. Each entry in the table has a unique profile ID assigned by the system. The profile ID is a link that can be used to modify a project. The table can also include start date, milestones, or any other project-related information. This table can also include the contractors that are authorized to work on the project, but the preferred embodiment puts this information in the contractor profile table, or alternatively, the timecard business rules.

The contractor profile table contains the data required for a procurement management system member to enter billable hours into the timecard process. The contractor profile table includes: name (generally the name of the contractor who will be entering hours, but any labor provider identifier can be used); employer (organization the contractor works for, such as an agency); project (projects the contractor is allowed to work on); work type (the type of work the contractor is allowed to enter hours against, such as normal, overtime, holiday, and so on); hourly rate (rate charged by the employer for the contractor's time, only displayed for approvers); type of currency (the currency used to for calculating costs, such as USD); approver 123 (the procurement management system member who can approve line items for this contractor 121); cost center (the accounting code associated with this project, only displayed for approvers). Each entry in the table has a unique profile ID assigned by the system. The profile ID is a link that can be used to modify a contractor profile. The contractor profile table may also include: contractor social security number; contractor home address and phone number; and any other contractor-related information.

The timecard business rules can include things such as: availability of the timecard process to the contractor 121 (the contractor 121 can create a timecard); maximum number of hours (or billing amount) per period: total budget for contractors on the project; the approval process for the organization (the type of approval process, e.g., multiple levels of approval, etc.); and any other rules the administrator wish to include.

The procurement management system approval matrix can be thought of as a grid with projects (or contractors) on rows and approvers on the columns. If a location on the grid is marked as "approve", then the approver corresponding to that column can approve projects (or contractors) that correspond to that row. This matrix can be specified as a list, table, or any other form, as long as it is clear which approvers can approve expenditures for which projects.

Timecard output formatting is needed if the payment processing 111 is a legacy system that an organization is using. Since most companies have had an accounts payable system in place long before using a procurement management system 100, when the procurement management system 100 is adopted by the organization, it will probably have to work with the existing accounts payable system.

The procurement management system 100 assigns a default accounting code to each timecard line item. In the timecard interface, contractors 121 cannot see the accounting code, but approvers 123 can see accounting codes in the approval interface. An approver 123 can change or add to the default accounting code specified for any timecard line item. In the administrator interface or super-administrator interface, a timecard approval can be cancelled. The timecard interface, approval interface, administrator interface, and super-administrator interface have been described as different graphics user interfaces, but they could be implemented as a single user interface (or any combination of various user interfaces) with different privileges, depending on who has logged on.

Figure 2:
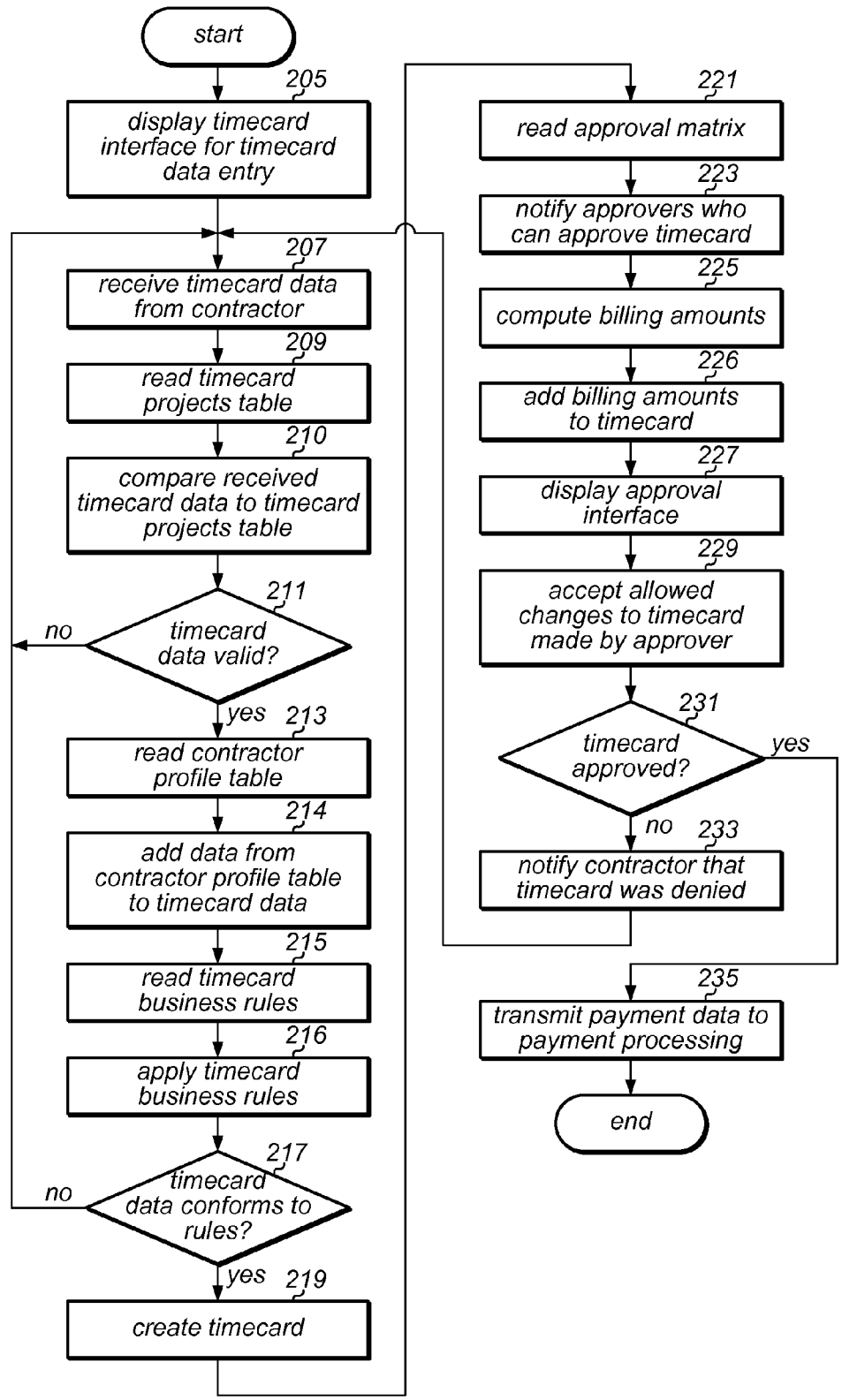
FIG. 2 is a flow diagram for timecard processing in a procurement management system, in accordance with an embodiment of the present invention.

FIG. 2 is a flow diagram in accordance with an embodiment of the present invention. The system 100 performs a first displaying step 205, in which a timecard interface for entering timecard data is provided. This timecard interface can be implemented in a variety of ways, as know in the art. The preferred embodiment uses a web-based browser, so as to be platform independent. A contractor 121 logs onto the procurement management system 100. In the preferred embodiment, the contractor's login ID can identify the contractor 121, so the contractor 121 does not necessarily need to retype his name or other identifier. The contractor 121 inputs timecard data via the timecard interface.

The procurement management system 100 performs a receiving step 207, thereby obtaining the timecard data from the contractor. The timecard data includes contractor-specific information, such as the contractor name. The timecard data also includes one or more line items, where each line item is an amount of labor, type of labor, and a project to which the labor is charged. The amount of labor is generally in hours, but can be in other units of time (e.g., days) or an a milestone basis (i.e., achieving a certain goal, such as packing so many boxes or writing a particular computer program). The type of labor is generally regular, overtime, or holiday hours, but could be different types of tasks (e.g. a contractor 121 may perform a management task and an engineering design task that could have different billing rates), and all of these items could be typed into the timecard interface or selected from a menu.

A project can be represented in the timecard interface with a project code or name, or could be selected from a menu in the timecard interface. An important, but not essential, feature of the invention is the timecard interface hiding (i.e., not revealing) the billing information and accounting codes from the contractor 121. A line item in the timecard interface can be designed to have either: (A) a plurality of types of labor for the same project; or (B) one type of labor for a project, thereby requiring a plurality of line items for a project if a plurality of types of labor need to be input for the timecard.

In the timecard interface, the logged in user might not correspond to the contractor identifier that is entered. Such a situation can occur when an administrative assistant is authorized to enter timecards on behalf of someone else. Such authorizations should be included in the timecard projects table, the contractor profile table, or the timecard business rules. The timecard data should then include a separate identifier for the person (or persons, if done over multiple logins by different people) who entered the timecard data, thereby providing a traceable record.

The procurement management system 100 performs a first reading step 209, in which at least one timecard projects table is read, the timecard projects table being stored somewhere in the system 100 and maintained by system administrators.

The information in the timecard projects table is used in the compare step 210, which checks the received timecard data for validity. For example, a contractor 121 may attempt to charge overtime hours to a project that does not allow overtime hours. Such a condition would be indicated for the project in the timecard projects table. Information from the timecard project table can augment the timecard data by being stored into the timecard. The timecard projects table can be implemented many ways as would be know to anyone practicing the art, and, as an example, the timecard projects table could be a plurality of smaller tables, possibly one for each project.

In a first decision step 211, if the timecard is not valid according to the timecard projects table, the data is not accepted in the timecard interface, and the contractor 121 must input different data to the system 100, which repeats the receiving step 207.

The procurement management system 100 performs a second reading step 213, in which at least one contractor profile table is read from a storage system within the system 100. Data within a contractor profile table corresponds to the contractor 121 whose timecard is being entered into the timecard interface.

The procurement management system 100 performs an data adding step 213, in which data from a contractor profile table is added 213 to the timecard data, the added data including the employer of the contractor 121 and the various billing rates. The adding of data can be accomplished by including a pointer to the appropriate data, rather than adding the data itself.

The procurement management system 100 performs a third reading step 215, in which timecard business rules are obtained from storage somewhere in the system 100.

The system 100 uses the timecard business rules in an application step 217, wherein the rules are applied to the timecard data. In a second decision step 217, if the timecard data does not conform to the timecard business rules, the data is not accepted in the timecard interface, and the contractor 121 must input different data, done by repeating the receiving step 207. One possible timecard business rule is the accessibility of a contractor 121 to the entire system 100, in which case the contractor 121 might not be even able to log onto to the system 100, but could also mean any timecard input with an invalid contractor identifier would not be accepted.

If the timecard data conforms to the timecard business rules, the system performs a timecard creation step 219, wherein the system 100 stores the timecard data as a timecard so it can undergo further processing. Prior to this step 219, incomplete timecard data my also be stored, but is not treated as a completed timecard and is not processed until it is completed.

The preferred format for the system 100 to store timecards is in XML format, because of its flexibility and extensibility. FIG. 3 shows an exemplary timecard in XML format, and has each line numbered 301 to 336. FIG. 3 shows: (1) the file is a timecard 302-303; (2) the buyer 304-305; (3) the contractor employer 306-307; (5) the contractor name 308-309; (6) the type of labor supplied 310-311; (7) a first line item 312-323; and (8) a second line item 324-335.

The procurement management system 100 performs a fourth reading step 221, in an approval matrix is obtained from storage somewhere in the system 100. The system 100 performs a notification step 223, in which designated approvers (as designated in the approval matrix) are notified 223. This notification 223 can be done via email or with an indicator in a user interface.

The system 100 performs a billing computation step 225, in which the billing amounts per line item and a total for the timecard are computed. This computed information is added to the timecard in a data addition step 226.

When an approver 123 wants to review timecards for possible approval, the approver 123 requests the system 100 to perform a second displaying step 227, in which an approval interface is provided. The approval interface displays the timecard including: contractor identifier (name, etc.), one or more line items, and the total amount. Each line item generally includes: a project identifier, a labor type, quantity of labor, an accounting code, a billing rate, and computed billing amount for the line item.

The approver 123 can change the timecard data, and the system 100 performs an acceptance step 229 for changes entered via the approval interface. Depending on the approver's 123 authority, some changes may not be allowed by the approval interface. If no changes are made, the acceptance step 229 is a null operation.

In a third decision step 231, if the timecard is not approved, a notification step 233 is performed in which notice is sent to the contractor 121, requiring the contractor 121 to revise the timecard data, thereby causing the system to return to the receiving step 207.

If the timecard is approved by the approver 123 (or approvers, in the case of multiple levels of approval), payment data (e.g., billing amounts, contractor employer, etc.) is transmitted to payment processing in a transmitting step 235.

The timecard business rules could have an effect on the approval steps 223, 227, 229, and 231 in that multiple approvers 123 could be required. The number of approvers 123 could depend on the total billing amount or the type of work being performed. The timecard business rule specification is flexible enough to designate an entire approval tree with appropriate conditional decisions.

The order of the steps in FIG. 2 are implementation dependent, and could certainly be performed in a different order. For example, the reading 209, 215, and 221 of tables, rules, and matrices could be done ahead of time, and could be shared amongst the processing of a plurality of timecards.

The preferred embodiment of the present invention, timecard processing in a procurement management system, is thus described. While the present invention has been described in particular embodiments, it should be appreciated that the present invention should not be construed as limited by such embodiments, but rather construed according to the below claims.

What is claimed is:

1. In a computing system, a method of processing timecards in a procurement system, comprising:
   A) providing a first user interface for entry of timecard data, and receiving timecard data entered via the first user interface;
   B) computing billing amounts using said entered timecard data;
   C) providing a second user interface displaying data, said displayed data comprising said timecard data and said billing amounts;
   D) accepting changes to said displayed data;
   E) receiving approval for payment of said billing amounts; and
   F) transmitting said approved billing amounts to a payment processing function;
   wherein said first user interface and said second user interface are a single user interface, wherein said single user interface behaves as said first interface and said second user interface depending on who logs into said single user interface;
   wherein A-F are performed by an electronic procurement management system configured to provide for the electronic procurement of goods, wherein said approval for payment is provided through a same approval process of the electronic procurement management system that is used for approving purchase requisitions for goods.

2. A method as described in claim 1 wherein said entered timecard data comprises:
   i) a labor provider identifier corresponding to a labor provider;
   ii) one or more project identifiers; and
   iii) for each said project identifier, one or more quantities of labor.

3. A method as described in claim 1 wherein said displayed data further comprises:

i) a labor provider identifier corresponding to a labor provider;
ii) one or more project identifiers; and
iii) for each said project identifier, one or more quantities of labor;
iv) one or more accounting codes; and
v) one or more billing rates.

4. A method as described in claim 1, further comprising:
G) reading a timecard projects table; and
H) comparing said entered timecard data to said timecard projects table to determine if said entered timecard data is valid.

5. A method as described in claim 1, further comprising:
I) reading a contractor profile table to add data to said timecard data, said contractor profile table comprising:
i) employer; and
ii) billing rates.

6. A method as described in claim 1, further comprising:
J) reading timecard business rules; and
K) determining whether said timecard data conforms to said timecard business rules.

7. A method as described in claim 1, further comprising:
L) reading an approval matrix, said approval matrix comprising a list of approvers, each said approver having an indication of which of said projects said each approver can approve; and
M) notifying at least one said approver to existence of said entered timecard data.

8. A computer-readable storage medium storing program instructions, that when executed on a computer implement:
A) providing a first user interface for entry of timecard data, and receiving timecard data entered via the first user interface;
B) reading a contractor profile table to add data to said timecard data, said contractor profile table comprising:
i) employer; and
ii) billing rates;
C) computing billing amounts using said entered timecard data;
D) providing a second user interface displaying data, said displayed data comprising said timecard data and said billing amounts;
E) accepting changes to said displayed data;
F) receiving approval for payment of said billing amounts; and
G) transmitting said approved billing amounts to a payment processing function;
wherein A-G are performed by an electronic procurement management system configured to provide for the electronic procurement of goods, wherein said approval for payment is provided through a same approval process of the electronic procurement management system that is used for approving purchase requisitions for goods.

9. The computer-readable storage medium of claim 8, wherein the program instructions are further executable to implement:
i) a labor provider identifier corresponding to a labor provider;
ii) one or more project identifiers; and
iii) for each said project identifier, one or more quantities of labor.

10. The computer-readable storage medium of claim 8, wherein the program instructions are further executable to implement:
i) a labor provider identifier corresponding to a labor provider;
ii) one or more project identifiers; and
iii) for each said project identifier, one or more quantities of labor;
iv) one or more accounting codes; and
v) one or more billing rates.

11. The computer-readable storage medium of claim 8, wherein the program instructions are further executable to implement:
wherein said first user interface and said second user interface are a single user interface, wherein said single user interface behaves as said first interface and said second user interface depending on who logs into said single user interface.

12. The computer-readable storage medium of claim 8, wherein the program instructions are further executable to implement:
H) reading a timecard projects table; and
I) comparing said entered timecard data to said timecard projects table to determine if said entered timecard data is valid.

13. The computer-readable storage medium of claim 8, wherein the program instructions are further executable to implement:
J) reading timecard business rules; and
K) determining whether said timecard data conforms to said timecard business rules.

14. The computer-readable storage medium of claim 8, wherein the program instructions are further executable to implement:
L) reading an approval matrix, said approval matrix comprising a list of approvers, each said approver having an indication of which of said projects said each approver can approve; and
M) notifying at least one said approver to existence of said entered timecard data.

15. In a computing system, a method of processing timecards in a procurement system comprising:
A) providing a first user interface for entry of timecard data, said timecard data comprising:
i) labor provider identifier corresponding to a labor provider;
ii) one or more project identifiers; and
iii) for each said project identifier, one or more quantities of labor;
B) receiving said timecard data;
C) reading a timecard projects table, said timecard projects table comprising:
i) one or more project identifiers each corresponding to a project; and
ii) types of labor that can be applied to each of said projects;
D) comparing said received timecard data to said timecard projects table to determine if said received timecard data is valid;
E) computing billing amounts using said billing rates and said quantities of labor;
F) providing a second user interface displaying data comprising:
i) said labor provider identifier;
ii) said one or more project identifiers;
iii) said one or more quantities of labor;
iv) one or more accounting codes;
v) one or more billing rates, said billing rates not viewable by said labor provider; and
vi) said computed billing amounts;
G) accepting changes to said displayed data;
H) receiving approval for payment of said billing amounts from said approver; and I) transmitting payment data, said payment data comprising said billing amounts;

wherein A-I are performed by an electronic procurement management system configured to provide for the electronic procurement of goods, wherein said approval for payment is provided through a same approval process of the electronic procurement management system that is used for approving purchase requisitions for goods.

16. A method as described in claim 15, further comprising:

J) reading timecard business rules, said timecard business rules table comprising:
  i) availability of said processing of timecards to said user; and
  ii) type of approval process; and K) applying said timecard business rules to determine if said timecard data conforms to said timecard business rules.

17. A method as described in claim 15, further comprising:

L) reading an approval matrix, said approval matrix comprising a list of approvers, each said approver having an indication of which of said projects said each approver can approve; and M) notifying at least one said approver to existence of said received timecard data.

18. An electronic procurement management system, comprising:

an approval processing mechanism configured to process approval of purchase requisitions for goods and to process approval of timecards, wherein to process approval of timecards comprises reading an approval matrix, said approval matrix comprising a list of approvers, each said approver having an indication of which projects said each approver can approve, and notifying at least one said approver to existence of said timecards; and a payment processing mechanism configured to process payment for purchase orders corresponding to approved ones of said purchase requisitions and to process payment for approved ones of said timecards.

19. The electronic procurement management system as recited in claim 18, further comprising a tracking process for tracking status of said purchase requisitions and said purchase orders, wherein the same tracking process is also configured for tracking status of said timecards.

* * * * *